Dec. 14, 1965  F. K. H. NALLINGER  3,223,404
AUXILIARY INSTALLATION FOR ACTUATION OF MOVABLE
BODY PARTS OF MOTOR VEHICLES
Filed Dec. 28, 1960
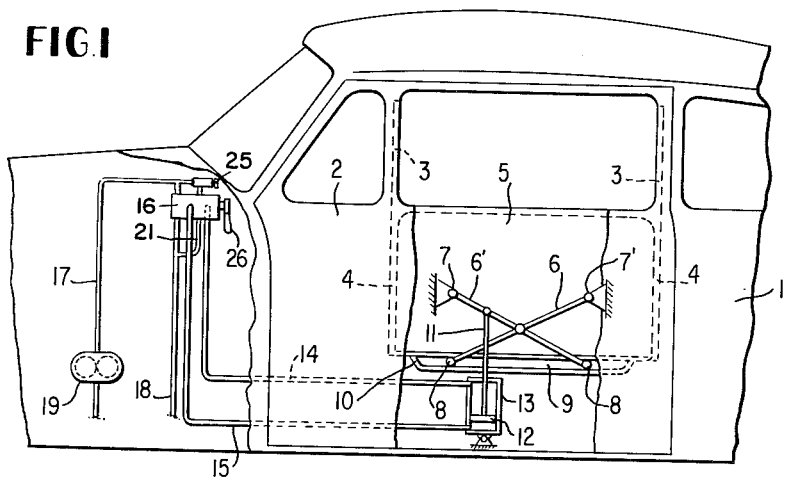
FIG. 1
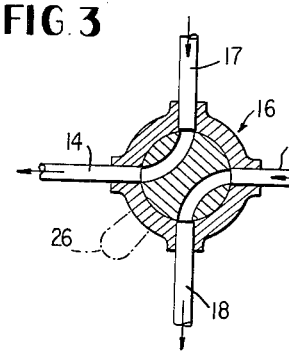
FIG. 3
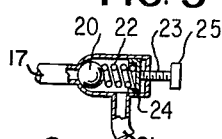
FIG. 5
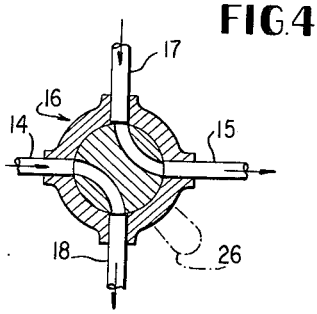
FIG. 4
FIG. 2
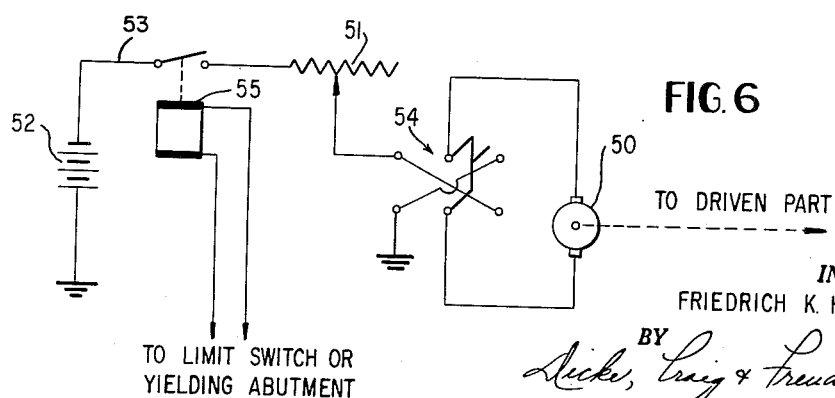
FIG. 6
TO LIMIT SWITCH OR
YIELDING ABUTMENT
TO DRIVEN PART
INVENTOR.
FRIEDRICH K. H. NALLINGER
BY
ATTORNEYS

United States Patent Office 3,223,404
Patented Dec. 14, 1965

3,223,404
AUXILIARY INSTALLATION FOR ACTUATION OF MOVABLE BODY PARTS OF MOTOR VEHICLES
Friedrich K. H. Nallinger, Stuttgart, Germany, assignor to Daimler-Benz Aktiengesellschaft, Stuttgart-Unterturkheim, Germany
Filed Dec. 28, 1960, Ser. No. 78,985
Claims priority, application Germany, Dec. 30, 1959,
D 32,238
7 Claims. (Cl. 268—125)

The present invention relates to an auxiliary control installation for the actuating system of movable parts, and more particularly relates to an auxiliary control installation to facilitate selective actuation of movable parts in motor vehicles such as windows, roofs, doors, seats, etc.

In connection with the motor vehicle parts adapted to be adjusted by means of an auxiliary force, for example, in connection with parts adapted to be raised and lowered, pivoted or horizontally displaced such as windows or doors, sliding seats, sliding roofs, roofs adapted to be raised, tops, telescopic columns for tilting devices or jacks, sliding louvers, ventilating flaps and the like, it is possible that a stronger force than that necessary under normal conditions is necessitated temporarily for the displacement or adjustment thereof, for example, if the window or door frames are frozen or iced, if dirt is present in the door guide channels or if the sliding seats jamb at the seat guide rails by reason of an eccentric load.

On the other hand, it is desirable to utilize such a relatively stronger adjusting force only in case of necessity because of the danger connected therewith of hurting a passenger by pinching or squeezing, for instance, the finger of a passenger, i.e., to utilize such relatively stronger force only when the part to be adjusted in fact can no longer be moved with the normally available force or if, for example, by reason of temporary climatic conditions, freeze-up or icing of the movable parts has to be reckoned with. On the other hand, there may exist also an interest to keep the adjusting force smaller than usual, for example, if children are taken along in the vehicle as passengers who should be protected as much as possible against getting pinched, wedged or squeezed whereby an eventual stoppage or halting of the adjusting movement as a result of an insufficient adjusting force would be acceptable.

The present invention satisfies the aforementioned requirements by rendering adjustable the magnitude or value of the actuating force or adjusting power. With a hydraulic or pneumatic installation, the adjustment of the actuating force may take place by means of a pressure regulating device, and with an electric installation by means of an adjustable resistance or rheostat. The actuating member for the control installation is thereby disposed preferably in proximity to the driver seated behind the steering wheel within easy reach of the latter thorugh of course it may also be located in any other suitable place.

Accordingly, it is an object of the present invention to provide an auxiliary actuating system for movable parts, especially movable parts in motor vehicles which obviates the shortcomings and dangers encountered with the prior art constructions and which makes possible the selection of an actuating force above or below the normally required or adjusted actuating force prevailing in the system.

Another object of the present invention resides in the provision of adjusting means for selectively adjusting the actuating force or adjusting power available in connection with the actuation of movable parts in motor vehicles so as to overcome temporary requirements for higher than normal actuating forces caused, for example, by temporary climatic conditions.

Still a further object of the present invention resides in the provision of a control system for the actuation by an auxiliary force of movable parts in motor vehicles which increases the safety to the passengers by enabling selective adjustment of the available actuating force.

Another object of the present invention resides in the provision of a control arrangement for adjusting the actuating force in an auxiliary power-assist system, especially for motor vehicles which is simple in construction, inexpensive in manufacture and installation, and which lends itself readily for adaptation in existing systems of this type.

These and other objects, features and advantages of the present invention will become more obvious from the following description when taken in connection with the accompanying drawing, which shows, for purposes of illustration only, several embodiments in accordance with the present invention, and wherein FIGURE 1 is a somewhat schematic partial elevational view of a door section of a motor vehicle provided with a window raising and lowering installation and a control arrangement in accordance with the present invention, FIGURES 2, 3 and 4 are partial cross-sectional views through the selective control installation for a fluid-operated window-actuating system in accordance with the present invention, the several views showing the pressure control valve in three different positions thereof, and FIGURE 5 is a side elevational view, partially in cross section, of the excess pressure valve shown in FIGURE 1.

FIGURE 6 is a schematic diagram showing an electrical system for use with an auxiliary electrically-operated power-assist installation according to the present invention.

Referring now to the drawing, wherein like reference numerals are used throughout the various views to designate corresponding parts, and more particularly to FIGURE 1, reference numeral 1 designates therein the side wall of the motor vehicle provided with a door aperture in which is arranged the door 2. The windowpane 5 is supported within the window frame 3 so as to be movable in the vertical direction. The window frame 3—3 extends downwardly in a widow guide arrangement 4—4 of conventional construction arranged within the door 2. The movement of the window 5 is guided by two link members 6 and 6' operatively connected with each other by suitable pivotal means in the center thereof and securely supported at the vehicle door 2 for pivotal movement at the outer ends thereof as at 7 and 7'. The opposite, free ends of the guide members 6 and 6' are provided with pin members 8 which engage in an essentially horizontal slot 9 of a windowpane frame 10. The raising and lowering movements of the window 5 are realized by means of a piston rod 11 is actuated by means of an adjusting piston 12 adapted to be loaded with a suitable pressure medium at the upper or lower side thereof. The piston 12 thereby slides in a suitably supported cylinder 13. One pressure line 14 and 15 each terminates within the cylinder 13 in the space above and below the piston 12, respectively. Both lines 14 and 15 lead to a shifting valve generally designated by reference numeral 16.

The shifting valve 16 is constructed, as shown more fully in FIGURES 2, 3 and 4, as a four-way valve and makes possible three shifting positions thereof as will appear more fully hereinafter. A supply line 17 supplying a pressure medium leads to the shifting valve 16. Additionally, a return line 18 leading back to the sump or reservoir branches off from the shifting valve 16. A supply pump 19 of suitable construction supplying a fluid medium under pressure is arranged within the supply line 17 which pump, for example, draws oil out of the lubricating circulatory system of the vehicle engine driving the vehicle to supply a part thereof for purposes of actuating the window or other suitable parts to be actuated by the pressure medium. The pump 19 normally supplies an excess quantity of pressure medium to the shifting valve 16. Any excess quantities of the fluid medium under pressure can thereby flow back into return line 18 through an excess pressure valve 20 of suitable construction and through a by-pass line 21 (FIGURE 1) by-passing the valve 16.

As may be readily seen from FIGURE 5, the return or excess valve 20 is under the influence of a closure spring 22 the pretension of which may be adjusted by means, for example, of a spring dish 24 adjustable by means of a threaded spindle 23. The threaded spindle 23 may be adjusted from the outside thereof by means of a knob 25 which is arranged preferably in direct proximity to the shifting lever 26 for the shifting valve 16 within easy reach of the driver.

Operation

The operation of the installation described hereinabove and illustrated in FIGURES 1 through 5 is as follows:

In the position of the lever 26 illustrated in FIGURE 2, the connection between the pressure supply line 17 and the other lines 14 and 15 is interrupted. Consequently, the piston 12 retains the position thereof which it had assumed previously just prior to interruption of the communication between the respective lines so that the window 5 is also retained in the same position it had previously assumed. If the shifting lever 26 is displaced into the position thereof illustrated in FIGURE 3, then a connection or communication is established between the supply line 17 and the pressure supply line 14 whereby the space above the piston 12 is subjected to pressure by the arrival thereat of the pressure medium. At the same time, the shifting valve 26 also provides in the position illustrated thereof in FIGURE 3 a communication between line 15 and the return line 18 so that the oil or fluid medium disposed within cylinder 13 below the piston 12 is able to flow off through the return line 18. Accordingly, the piston 12 and therewith the window 5 begins to move downwardly until it abuts against predetermined stop means.

Conversely, if the shifting lever 26 is shifted into the position illustrated in FIGURE 4, then the space above the piston 12 is relieved and the space below the piston 12 is subjected to pressure with the result that the windowpane 5 is now displaced in the upward direction until it comes into abutment against a stop means. One or both of the stop means may thereby be in the form of limit switches or effective in an analogous manner as is well known.

Under all operating conditions, however, the working pressure of the actuating installation according to the present invention is adjusted to a predetermined value by the presence of the excess pressure valve 20 whereby the value is normally selected so as to be adequate for the opening and closing movement of the window or other movable part adapted to be actuated thereby. If the window now becomes jammed for any reason, for example, by icing or freeze-up of the window frame, then the tension of the return valve spring 22 only has to be increased by a further inward threading of the threaded spindle 23. The pressure also increases correspondingly in line 17 until the resistance is overcome with respect to the windowpane 5 that is to be displaced.

The danger of jamming, wedging, or pinching, for example, of fingers placed on the window frame is not excessively large. Not only because at the instant of the sudden raising of the window, the latter possibly moves in a jump-like manner by a slight amount and therewith the adjusting pressure decreases rapidly at least for the moment, but also because the driver, as a rule, would inform the passengers of his intention to increase the pressure. However, a safety arrangement may be installed within the range of movement of the movable part such as the window, for example, in such a manner that the upper window ledge is constructed as a springily yielding shifting ledge which, for example, by closing the circuit acts on a relay or magnetic valve that interrupts the pressure supply line to the cylinder and therewith also halts the closure movement of the window.

It is also within the purview of the present invention to realize the pressure control in a step-like manner, for example, in that instead of the adjusting screw an adjusting lever having notches, detents or a click-mechanism is provided which acts on the control spring 22 to pre-load the same in varying degrees.

Additionally, it is clear that the present invention is not limited to the embodiments illustrated in FIGURES 1 through 4 of the drawing showing a vertically displaceable window, nor to the particular actuating mechanism thereof. The latter may be replaced, for example, by a simple guide, by a pulley and cable drive, by a chain and sprocket drive, by a toothed rack or the like. Furthermore, it is also understood that the direction of movement of the window is also of no significance insofar as the present invention is concerned and may be varied at will.

Furthermore, as mentioned hereinabove, the hydraulic actuating installation may also be replaced by an electric installation as shown in FIGURE 6. In that case, an electric direct-current motor 50 of the reversible type is used as actuating means which drives the actuating mechanism for the movable part such as the window raising and lowering mechanism. In the place of the shifting valve 16 an adjustable resistance 51 or rheostat is used in circuit 53 connecting the battery 52 with the motor 50 so as to adjust the actuating force of motor 50.

Additionally, a reversing switch 54 of any suitable construction may be used in the circuit so as to actuate the motor 50 for rotation in one or the other direction of rotation. Furthermore, a switch means 55, which may be for example, magnetically of mechanically controlled from the yielding stop means, such as the yielding window ledge member may be inserted in the circuit 53 to disable energization of the motor 50 to protect the safety of the passengers in case of the danger of jamming. Of course, the control arrangement is shown in FIGURE 6 only schematically and may be varied at will to take into consideration the particular type of motor, as is well known in the art in connection with different types of motors such as series motors, shunt motors, compound motors and the like. Consequently, it is within the scope of the present invention to provide any suitable actuating and adjusting mechanism that is suitable to selectively vary the actuating force or adjusting power produced by the motor 50, depending only on the actual construction of the latter.

Moreover, as mentioned already hereinabove, the present invention is not only suitable for the control of the movement of windows but is also applicable to all movable installations in motor vehicles in which there exists a danger of jamming.

Thus, it is obvious that the present invention is susceptible of many changes and modifications without departing from the spirit and scope thereof, and I, therefore, do not wish to be limited to the details shown and described herein but intend to cover all such changes and modifications as are encompassed by the scope of the appended claims.

I claim:

1. An apparatus for automatically raising and lowering the window of a motor vehicle having a passenger compartment and at least one window therefor adapted to be selectively moved, comprising frame means for said window, and actuating means for moving said window in said frame means comprising a source of variable power for supplying the actuating force to said window and control means operatively connecting said source to said window including first means for applying said actuating force to said window to selectively raise and lower the same, second means effectively and selectively varying in a predetermined manner the actuating force applied to said window, said first and said second means each including a control element adapted to be controlled by hand arranged within the passenger space of the vehicle.

2. An apparatus for automatically raising and lowering the window of a motor vehicle having a passenger compartment and at least one window therefor adapted to be selectively moved comprising frame means for said window, and actuating means for moving said window in said frame means including an auxiliary power supply for supplying the actuating force to said window comprising a source of fluid medium under pressure, a piston-cylinder assembly, said piston being operatively connected to said window, and means operatively connecting said source to said cylinder on both sides of said piston and control means for said actuating means comprising first means for selectively applying said actuating force to opposite sides of said cylinder to selectively raise and lower said window, and second means effectively and selectively varying at will the actuating force applied to said window by said actuating means, said first and second means each including a control element for said means operatively connecting said source to said cylinder adapted to be controlled by hand and arranged within the passenger space of the vehicle.

3. An apparatus for automatically raising and lowering the window of a motor vehicle having a passenger compartment and at least one window therefor adapted to be selectively moved comprising frame means for said window, and actuating means for moving said window in said frame means including an auxiliary power supply for supplying the actuating force to said window comprising a source of fluid medium under pressure, a piston-cylinder assembly, said piston being operatively connected to said window, and means operatively connecting said source to said cylinder on both sides of said piston and control means for said actuating means comprising first means for selectively applying said actuating force to opposite sides of said cylinder to selectively raise and lower said window, and second means effectively and selectively varying at will the actuating force applied to said window by said actuating means, said first and second means each including a control element for said means operatively connecting said source to said cylinder adapted to be controlled by hand and arranged within the passenger space of the vehicle.

4. An apparatus for automatically raising and lowering the window of a motor vehicle having a passenger compartment and at least one window therefor adapted to be selectively moved comprising frame means for said window, and actuating means for moving said window in said frame means including an auxiliary power supply for supplying the actuating force to said window comprising a source of fluid medium under pressure, a piston-cylinder assembly, said piston being operatively connected to said window, and means operatively connecting said source to said cylinder on both sides of said piston and control means for said actuating means comprising first valve means for selectively controlling the application of said actuating force to a respective side of said piston to selectively raise and lower said window, and second valve means for selectively varying at will the actuating force applied to said piston by said actuating means, said first valve means including a control element adapted to be controlled by hand arranged within the passenger space of the vehicle, said second valve means comprising a spring biased excess pressure valve including a control element for adjusting the tension in said spring whereby the pressure applying to said piston is varied, said last-mentioned control element being arranged within the passenger space of the vehicle and being adapted to be operated by hand at will.

5. An apparatus for automatically raising and lowering the window of a motor vehicle having a passenger compartment and at least one window therefor adapted to be selectively moved comprising the frame means for said window, and actuating means for moving said window in said frame means including an auxiliary power supply for supplying the actuating force to said window and control means connecting said supply to said window including first means for applying said actuating force to said window to selectively raise and lower the same, second means effectively and selectively varying the actuating force applied to said window, said first and second means each including a control element adapted to be controlled by hand arranged within the passenger space of the vehicle.

6. An auxiliary installation for facilitating the actuation of adjustable parts in motor vehicles according to claim 5, wherein said second means adjusts the actuating force in a continuous stepless manner.

7. An auxiliary installation for facilitating the actuation of adjustable parts in motor vehicles according to claim 5, wherein said second means adjusts the actuating force in a step-like manner.

References Cited by the Examiner

UNITED STATES PATENTS

| | | | |
|---|---|---|---|
| 2,773,353 | 12/1956 | Oishei | 268—125 X |
| 2,838,140 | 6/1958 | Rossmusson et al. | 188—97.1 |
| 2,911,212 | 11/1959 | Forster | 268—125 |

FOREIGN PATENTS 840,299   7/1960   Great Britain.

HARRISON R. MOSELEY, *Primary Examiner*.
JOSEPH D. BEIN, *Examiner*.